United States Patent
Bauer et al.

(10) Patent No.: US 10,205,181 B2
(45) Date of Patent: Feb. 12, 2019

(54) EXHAUST GAS SYSTEM AND MOTOR VEHICLE HAVING AN EXHAUST GAS SYSTEM

(71) Applicant: Bayerische Motoren Werke Aktiengesellschaft, Munich (DE)

(72) Inventors: Michael Bauer, Unterfoehring (DE); Martin Scherrer, Poing (DE); Martin Moser, Munich (DE); Johannes Schmid, Munich (DE); Norbert Frisch, Planegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 143 days.

(21) Appl. No.: 15/070,087

(22) Filed: Mar. 15, 2016

(65) Prior Publication Data
US 2016/0197362 A1 Jul. 7, 2016

Related U.S. Application Data

(63) Continuation of application No. PCT/EP2014/068298, filed on Aug. 28, 2014.

(30) Foreign Application Priority Data

Sep. 20, 2013 (DE) ........................ 10 2013 218 958

(51) Int. Cl.
*B60L 11/18* (2006.01)
*H01M 8/04* (2016.01)
(Continued)

(52) U.S. Cl.
CPC ..... *H01M 8/04014* (2013.01); *B60L 11/1896* (2013.01); *H01M 8/04059* (2013.01);
(Continued)

(58) Field of Classification Search
None
See application file for complete search history.

(56) References Cited

U.S. PATENT DOCUMENTS

| 7,998,633 B2 | 8/2011 | Aoki et al. |
| 2003/0031966 A1* | 2/2003 | Berry ...................... F23C 13/00 431/7 |

(Continued)

FOREIGN PATENT DOCUMENTS

| CN | 101915080 A | 12/2010 |
| DE | 103 57 198 A1 | 7/2005 |

(Continued)

OTHER PUBLICATIONS

International Search Report (PCT/ISA/210) issued in PCT Application No. PCT/EP2014/068298 dated Nov. 24, 2014, with English translation (four (4) pages).
(Continued)

*Primary Examiner* — Scott J. Chmielecki
(74) *Attorney, Agent, or Firm* — Crowell & Moring LLP

(57) ABSTRACT

An exhaust system is provided for a device having at least one fuel cell. The exhaust system includes at least one exhaust duct for transporting anode-side and/or cathode-side exhaust gas of the fuel cell, at least one air inlet for supplying air, at least one air feeding device for feeding in the supplied air, at least one heat exchanger for heating up the supplied air, a mixing region for mixing exhaust gas of the fuel cell transported by way of the exhaust duct with the supplied air and forming a mixed exhaust gas, and a mixed exhaust gas outlet for carrying the mixed exhaust gas away from the exhaust system.

19 Claims, 2 Drawing Sheets

(51) Int. Cl.
*H01M 8/04014* (2016.01)
*H01M 8/0662* (2016.01)
*H01M 8/04119* (2016.01)
*H01M 8/04007* (2016.01)
*H01M 8/04186* (2016.01)

(52) U.S. Cl.
CPC ... *H01M 8/04179* (2013.01); *H01M 8/04186* (2013.01); *H01M 8/0662* (2013.01); *H01M 2250/20* (2013.01); *Y02T 90/32* (2013.01); *Y02T 90/34* (2013.01)

(56) References Cited

U.S. PATENT DOCUMENTS

| | | | |
|---|---|---|---|
| 2003/0064274 A1* | 4/2003 | Blaszczyk | H01M 8/04089 429/415 |
| 2005/0031917 A1* | 2/2005 | Margiott | H01M 8/04201 429/429 |
| 2009/0045006 A1* | 2/2009 | Kondo | F01N 1/04 181/252 |
| 2010/0003552 A1* | 1/2010 | Kelly | F24D 12/02 429/411 |
| 2010/0003576 A1 | 1/2010 | Tamura | |
| 2010/0003577 A1 | 1/2010 | Eguchi et al. | |
| 2010/0136451 A1* | 6/2010 | Imanishi | B60L 11/1881 429/432 |
| 2011/0143241 A1* | 6/2011 | Tighe | H01M 8/04231 429/428 |
| 2013/0087305 A1 | 4/2013 | Ikeya | |
| 2013/0149625 A1 | 6/2013 | Ikeya | |
| 2013/0224622 A1* | 8/2013 | Skiba | H01M 8/023 429/482 |
| 2013/0288160 A1* | 10/2013 | Kurre | B64D 41/00 429/513 |

FOREIGN PATENT DOCUMENTS

| | | |
|---|---|---|
| DE | 10 2009 031 312 A1 | 2/2010 |
| DE | 11 2011 102 248 T5 | 5/2013 |
| DE | 11 2011 102 865 T5 | 6/2013 |
| EP | 1 959 514 A1 | 8/2008 |
| JP | 2010-44960 A | 2/2010 |

OTHER PUBLICATIONS

German Search Report issued in counterpart German Application No. 10 2013 218 958.3 dated Oct. 2, 2013, with partial English translation (ten (10) pages).

Chinese-language Office Action issued in counterpart Chinese Application No. 201480047719.9 dated Apr. 13, 2017 with English translation (10 pages).

* cited by examiner

EXHAUST GAS SYSTEM AND MOTOR VEHICLE HAVING AN EXHAUST GAS SYSTEM

CROSS REFERENCE TO RELATED APPLICATIONS

This application is a continuation of PCT International Application No. PCT/EP2014/068298, filed Aug. 28, 2014, which claims priority under 35 U.S.C. § 119 from German Patent Application No. 10 2013 218 958.3, filed Sep. 20, 2013, the entire disclosures of which are herein expressly incorporated by reference.

BACKGROUND AND SUMMARY OF THE INVENTION

The present invention relates to an exhaust system for a device comprising at least one fuel cell and to a motor vehicle that comprises such an exhaust system.

In devices operated with fuel cells, such as for example motor vehicles, and also including hybrid vehicles, the anode-side exhaust gas, which also includes what is known as an "anode purging gas", which substantially contains hydrogen, nitrogen, argon and water, and the cathode-side exhaust gas, which apart from oxygen and nitrogen contains water formed in the fuel cell reaction, are emitted together by way of an exhaust system into the environment.

The anode purging gas has the effect that, at certain operating points, the hydrogen concentration in the exhaust gas increases, so that complex measures have to be taken to prevent prescribed limit values for hydrogen exposure from being exceeded. Furthermore, there is no dilution of the exhaust gas, which in particular at cold times of the year leads to the formation of an aerosol as a result of water condensing out, and is manifested as a visible cloud of vapor. The exhaust gas is also only insufficiently carried away by the vehicle via conventional exhaust systems. It is also disadvantageous that, with the additional use of vehicle coolers and/or heat exchangers, separate outlets for the respective exhaust air and the fuel cell exhaust gas are provided, which complicates the structural design and the spatial arrangement of the device. US2010/0003552A1 describes a combined heat and power system, of which, inter alia, the condenser is not capable of preventing the formation of clouds of vapor in winter time.

Proceeding from this prior art, the object of the present invention is therefore to provide an exhaust system for a device comprising at least one fuel cell which, while being of a simple structural design, is distinguished by efficient dilution of the fuel cell exhaust gas, this preventing clouds of vapor from being formed by water condensing out and being conducive to hydrogen-containing exhaust gas being actively carried away from the device. The object of the present invention is also to provide a motor vehicle including an exhaust system that has a high level of operational reliability.

These and other objects are achieved according to the invention in the case of an exhaust system for a device comprising at least one fuel cell, the exhaust system comprising at least one exhaust duct for transporting exhaust gas of the fuel cell;
at least one air inlet for supplying air;
at least one air feeding device for feeding in the supplied air;
at least one heat exchanger;
a mixing region for mixing exhaust gas of the fuel cell transported by means of the exhaust ducting with the supplied air and forming a mixed exhaust gas; and
a mixed exhaust gas outlet for carrying the mixed exhaust gas away from the exhaust system.

The term "exhaust gas of the fuel cell" is understood as meaning anode-side exhaust gas, anode purging gas, cathode-side exhaust gas, and/or fuel cell exhaust gas, which comprises a mixture of anode-side exhaust gas and cathode-side exhaust gas. By passing supplied air through the heat exchanger and bringing together supplied air that has been passed through the heat exchanger and exhaust gas of the fuel cell, the mixed exhaust gas formed from the supplied air and the exhaust gas of the fuel cell can be carried away through just one outlet. This effectively reduces the number of exhaust-air outlets or exhaust-gas outlets in the device, while additionally providing a good spatial distribution of the exhaust gas away from the direct vicinity of the device. A heat exchanger which is connected to a cooling circuit of the fuel cell system, for example the HT or LT cooling circuit, may be used, for example, as the heat exchanger. It is not necessary to provide separate outlets for heat exchanger exhaust air and fuel cell exhaust gas, as a result of which the structural design of the exhaust system is simplified. The air may in this case be supplied from the direct vicinity of the heat exchanger and/or the air feeding device, for example also by a separate air admission system. The air may be fresh air or air that originates from a vehicle interior when the device according to the invention is used in a motor vehicle. By introducing and feeding supplied air from the vicinity through the heat exchanger, efficient dilution of the fuel cell exhaust gas and heating up of the air are achieved, so that the air can absorb more water, in order that formation of visible clouds of vapor from condensed-out water is prevented and very good dilution of the anode-side, hydrogen-containing fuel cell exhaust gas is accomplished, whereby the operational reliability of the device is increased. Legally prescribed limit values for hydrogen exposure can consequently be maintained very easily without additional safety measures.

According to an advantageous development, the air feeding device and the heat exchanger are connected by an air line, so that an air feeding section can be specifically set and an arrangement of the air feeding device and the heat exchanger can be easily set up in accordance with spatial conditions.

Also advantageously, in a direction of flow, that is to say a direction of flow of the supplied air, the air feeding device is arranged upstream or downstream of and/or in the heat exchanger. As an alternative to this, the air feeding device and the heat exchanger are arranged next to one another. The air feeding device is preferably arranged downstream of and/or in the heat exchanger. This allows the air stream to be specifically set and particularly efficient dilution of the exhaust gas of the fuel cell to be achieved, with at the same time a small space requirement.

Arranging an outlet of the exhaust duct upstream and/or downstream of the air feeding device or within the air feeding device has the effect that the exhaust gas of the fuel cell enters the exhaust system in the direct proximity of the air feeding device, so that intermixing with supplied air takes place at an early time and very effectively. For reasons of explosion protection, the outlet of the exhaust duct is preferably arranged downstream of the air feeding device.

Also advantageously, the anode-side exhaust gas is supplied upstream of and/or into an inlet of the exhaust duct and/or in the mixing region. This is conducive to good dilution of the anode exhaust gas.

Advantageously, the mixed exhaust gas outlet and the form thereof, that is to say structure and angling, and also its arrangement, are formed in such a way that optimum exhaust ducting is achieved, while making allowance for pressure losses, suction effect and distribution of the exhaust gas. An improvement in the suction effect as a result of the higher pressure level of the exhaust gas of the fuel cell may preferably also accomplish or simplify the feeding in of air through the air feeding device and the heat exchanger, which is advantageous in particular when using inactive air feeding devices. The advantageous development that the mixed exhaust gas outlet has a spiral or fan-shaped structure or at least two regions with different cross sections has the effect that better and finer distribution of the exhaust gas into the environment is achieved. Clouds of vapor from condensed water are thereby effectively avoided.

To promote the dilution of the exhaust gas of the fuel cell with supplied air, advantageously at least one static mixer is provided, for example radially arranged through-flow openings for the exhaust gas, for intermixing the exhaust gas of the fuel cell with the supplied air.

The forming of clouds of vapor from condensed-out water can be avoided particularly efficiently by the mixing region having a structure and/or surface modification, for example in the form of porous materials or membranes, that is conducive to evaporation of water contained in the cathode-side exhaust gas.

Advantageously, a pressure level in the exhaust duct is greater than a pressure level in the heat exchanger and/or the air feeding device, since in this way a suction effect can act on the supplied air flowing through the heat exchanger. As a result, a feed rate that is conducive to intermixing and/or distribution of the mixed exhaust gas into the environment of the device.

Providing at least one sound-damping element allows acoustic optimization of the exhaust system. Also advantageously, an acoustic element can at the same time be conducive to evaporation of water.

The use of a partially passively operated heat exchanger simplifies the structural design of the exhaust system according to the invention.

To increase the operational reliability of the exhaust system, a distance between the heat exchanger and the exhaust duct is chosen such that an optimum suction effect and intermixing of the exhaust gas of the fuel cell with the supplied air are achieved. The formation of clouds of vapor from condensed-out water is also thereby efficiently prevented.

Providing a mixing device for mixing the anode-side exhaust gas and the cathode-side exhaust gas upstream of or at an inlet of the exhaust duct, with the formation of a fuel cell exhaust gas, has the effect that more efficient intermixing of the anode-side and cathode-side exhaust gases with one another, and consequently also with the air supplied in the mixing region, is optimized. As a result, a homogeneous mixed exhaust gas with a high level of dilution of separated-out hydrogen and water is achieved, which is beneficial to the operational reliability of the device.

The operational reliability of the exhaust system can be further increased if at least one hydrogen sensor is provided. The hydrogen sensor is preferably arranged in the exhaust duct. Also advantageously, the exhaust system according to the invention includes a water tank, a water line with a water feeding device for supplying water from the water tank into the fuel cell and a water outlet line for carrying water away from the tank. The water outlet line leads into the cathode-side exhaust gas, into a mixing device for mixing the anode-side exhaust gas and the cathode-side exhaust gas, into the air inlet, into the heat exchanger, into the mixing region and/or into the exhaust duct, preferably into the air inlet, into the heat exchanger and/or into the mixing region. This embodiment is suitable in particular for devices with at least one fuel cell that stores and/or gives off liquid water for the operating process, for example for systems with water injection in the fuel cell stack. For this purpose, the tank filling level of the tank must be regulated. The water outlet line is provided for this purpose. Leading of the water from the water tank into the heat exchanger or the air inlet by way of the water outlet line is particularly preferred, since this improves the cooling performance of the heat exchanger. It is also advantageous for it to lead into the mixing region, and here in particular directly onto the structure and/or surface modification for improving the evaporation of the water. Leading into the mixing region is also advantageous because the temperatures are high as a result of the short gas paths here, and condensing out in the line system can therefore be avoided.

In order to be able to supply water from the water tank by way of the water line to the fuel cell, the water tank first has to be filled. Externally supplied water may serve for this purpose, or else water that is produced in the cathode reaction, are condensed out or separated from the cathode exhaust gas, for example by use of a water separator, and are supplied to the tank. The carrying of water from the tank through the water outlet line may take place, for example, by the gravitational force of the water in combination with a valve, by active feeding, for example a pump, and/or passive feeding, for example a water-jet pump. Also advantageously, the water in the water outlet line may be heated by the circuit of the heat exchanger and/or electrically.

Also advantageously, the exhaust system according to the invention is characterized in that an anode exhaust gas line for transporting the anode-side exhaust gas and including an anode purging gas valve and an anode exhaust-gas outlet valve is provided between the exhaust duct and the fuel cell. The anode exhaust-gas outlet valve is in this case provided downstream of the anode purging gas valve, in particular at one end of the anode exhaust gas line. In order to carry out an anode purging operation, the anode purging gas valve and the anode exhaust-gas outlet valve are opened. In order to avoid high hydrogen concentrations remaining in the anode exhaust gas line, the anode exhaust gas line is made as short as possible. Also advantageously, the anode exhaust gas line may be kept free from hydrogen by way of an intake of dead air and the negative pressure produced by the Venturi effect at the end of the exhaust gas line. Furthermore, the ingress of air into the anode exhaust gas line may be avoided by use of an additional shut-off valve.

Likewise according to the invention, also described is a motor vehicle that includes an exhaust system as set out above. The motor vehicle according to the invention is distinguished by a simple design, efficient exhaust gas distribution and a high level of operational reliability.

The advantageous effects, advantages and refinements described for the exhaust system according to the invention also apply to the motor vehicle according to the invention.

To simplify the arrangement of the individual components of the exhaust gas device, to improve the transport of mixed exhaust gas away from the motor vehicle and thereby also increase the operational reliability of the motor vehicle, it is advantageously provided that the heat exchanger is arranged in a rear and/or lateral part of the motor vehicle and/or that the mixed exhaust gas outlet is arranged in a rear and/or lateral part of the motor vehicle.

As a result of the refinements according to the invention of the exhaust system according to the invention and of the motor vehicle according to the invention, the following advantages are obtained in particular:

The exhaust system has a compact and simple structure.

Efficient dilution of hydrogen from the anode-side exhaust gas of the fuel cell is achieved.

Prescribed limit values for hydrogen exposure can be maintained more easily and reliably.

The mixed exhaust gas is actively carried away from the device.

Formation of clouds of vapor from condensed-out water is reduced by dilution with air, in particular by passing through the heat exchanger.

Moist air is carried away from the device at greater speed.

Homogeneous and spatially well distributed carrying away of the mixed exhaust gas is achieved.

Condensed water can be optimally evaporated.

The absorption capacity of water in the air stream that leaves the heat exchanger is increased as a result of the heating.

The suction effect of the cathode-side exhaust gas facilitates the feeding of additional air through the heat exchanger.

Even when the air feeding device is switched off, air can be carried through the heat exchanger as a result of the suction effect.

The fuel-cell exhaust gas outlet and heat exchanger outlet for carrying away the air passed through the heat exchanger are formed by one component.

It is possible to dispense with an additional mixing device after supplying the anode-side exhaust gas.

It is easily possible to dispense with a hydrogen sensor while there is a high level of operational reliability of the device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
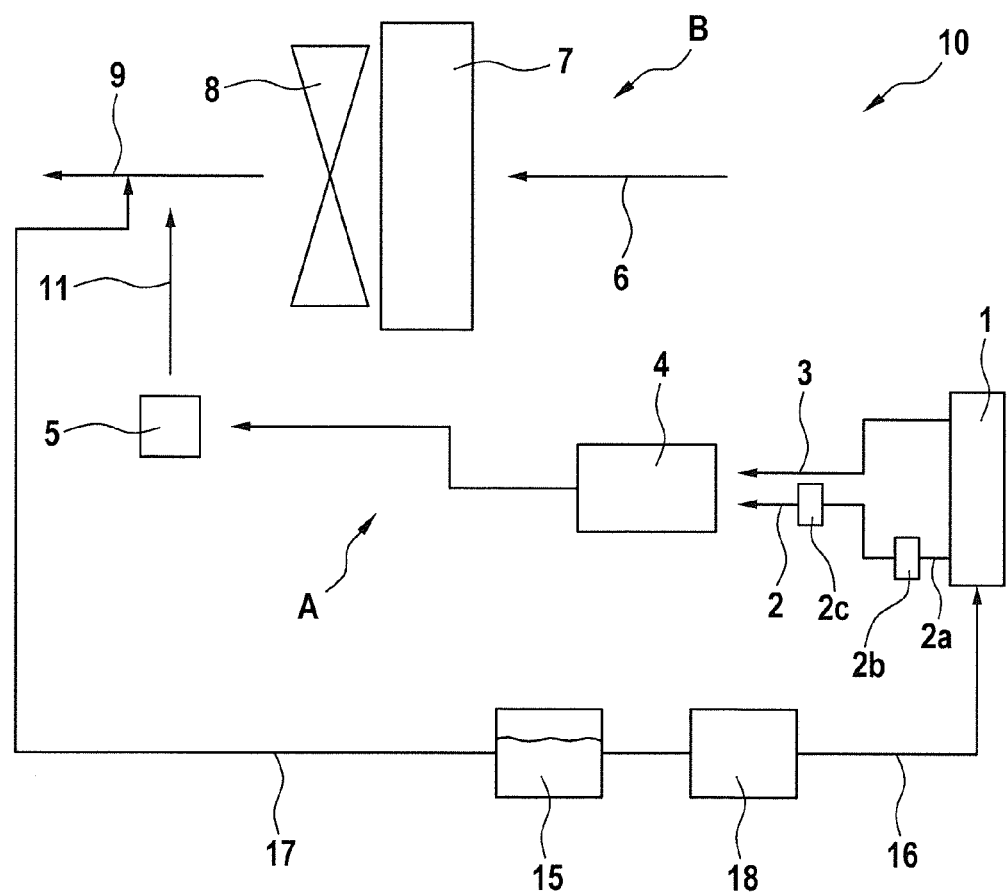
FIG. 1 is a schematic view of an exhaust system according to a first advantageous embodiment of the invention.
Figure 2:
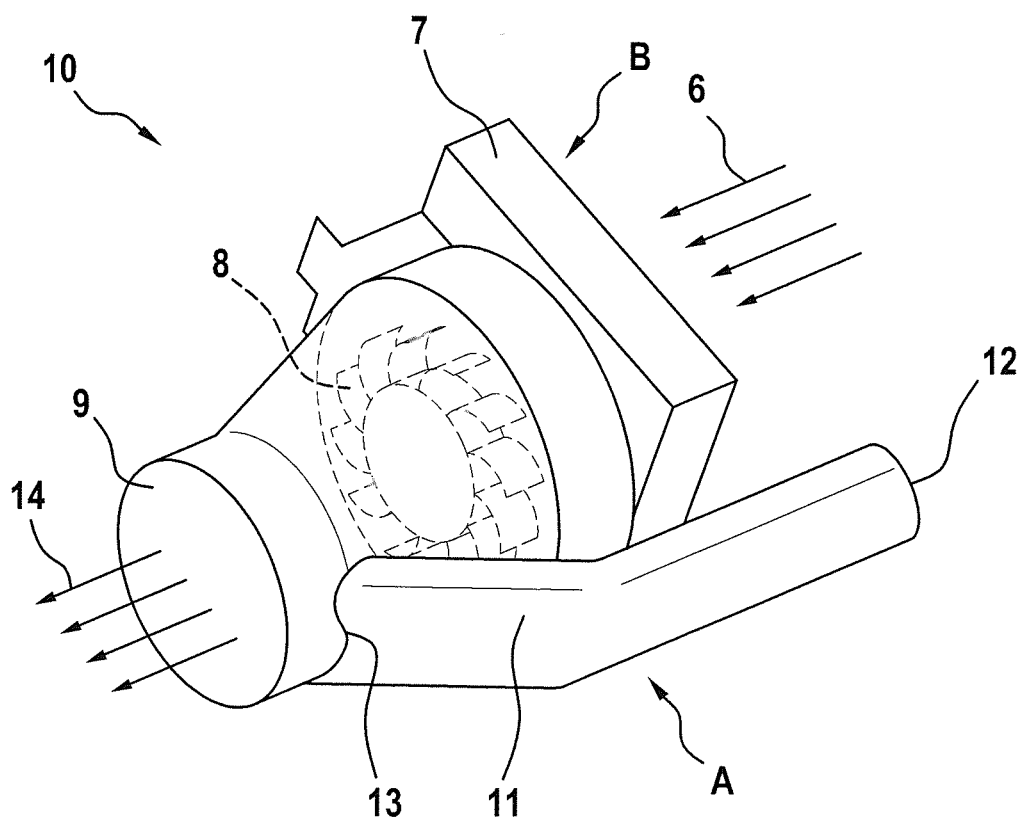
FIG. 2 is a schematic perspective view laterals from the front of an exhaust system of a second advantageous embodiment of the invention.

On the basis of FIGS. 1 and 2, two aspects of the exhaust system according to embodiments of the invention are described in detail. Only the aspects of the present invention that are of interest here are illustrated in the figures; all other aspects have been omitted for the sake of overall clarity. Furthermore, the same designations stand for the same components.

To be specific, FIG. 1 shows an exhaust system 10 for a device comprising at least one fuel cell 1. For the purposes of the invention, a fuel cell system having multiple fuel cells connected one behind the other and/or in parallel may also be connected to the exhaust system 10.

The fuel cell 1 produces anode-side exhaust gas 2 and cathode-side exhaust gas 3, which as a mixture is defined as fuel cell exhaust gas. The anode-side exhaust gas 2 substantially contains hydrogen, nitrogen, argon and water. On the other hand, the cathode-side exhaust gas 3 substantially contains oxygen, nitrogen and water that is produced in the fuel cell reaction.

The anode-side exhaust gas 2 is carried away from the fuel cell 1 by way of an anode exhaust gas line 2*a*. The anode exhaust gas line 2*a* also includes an anode purging gas valve 2*b* and an anode exhaust-gas outlet valve 2*c*. The anode exhaust-gas outlet valve 2*c* is, in this case, provided downstream of the anode purging gas valve 2*b*, in particular at one end of the anode exhaust gas line 2*a*. In order to carry out an anode purging operation, with the formation of an anode purging gas, the anode purging gas valve 2*b* and the anode exhaust-gas outlet valve 2*c* are opened.

The anode-side and cathode-side exhaust gases 2, 3 of the fuel cell 1, including the anode purging gas, which are initially kept separate, are mixed with one another in a mixing device 4, which may be formed as a static or active mixing device, and form a fuel cell exhaust gas, which is admitted to a hydrogen sensor 5.

The hydrogen sensor 5 determines the concentration of hydrogen in the fuel cell exhaust gas. It can in this way be ensured that the hydrogen concentration does not exceed a permissible limit value. If appropriate, safety precautions can be taken, preventing the fuel cell exhaust gas from being discharged into the environment and/or increasing the dilution of the hydrogen-laden gas mixture in the event of a permissible limit value for the hydrogen concentration being exceeded.

After passing the fuel cell exhaust gas through the region equipped with a hydrogen sensor 5, the fuel cell exhaust gas is admitted to a mixing region 9 by way of an exhaust duct 11.

The exhaust system 10 also includes a water tank 15, a water line 16 with a water feeding device 18 for feeding water from the water tank 15 into the fuel cell 1, and a water outlet line 17 for carrying water away from the water tank 15. By way of example, here the water outlet line 17 likewise leads into the mixing region 9. The water contained in the water tank 15 may be externally supplied water or water that is produced in the cathode reaction and is separated or condensed out from the cathode-side exhaust gas 3. For this purpose, a condenser or water separator may, for example, be introduced into the cathode-side exhaust gas 3.

In an air flow path B that is separate from the fuel cell exhaust-gas flow path A, air, that is to say fresh air from the vicinity of the exhaust system 10, is admitted by way of an air inlet 6 and supplied to a heat exchanger 7. The air may in this case originate from the direct vicinity of the heat exchanger 7, or be supplied by way of an air line. The heat exchanger 7 is adjoined by an air feeding device 8, which admits the supplied fresh air to the mixing region 9. As already stated, an outlet of the exhaust duct 11 of the fuel cell exhaust gas also leads into this mixing region 9.

In the mixing region 9, intermixing of fuel cell exhaust gas, supplied by way of the fuel cell exhaust-gas flow path A, with the air supplied by way of the air flow path B and water from the water tank 15, carried from the water outlet line 17, takes place. An additional mixing device, in particular a static mixer, may be provided for this purpose. The supplied air is sucked into the mixing region 9 by the suction effect produced by the fuel cell exhaust-gas stream, so that efficient intermixing takes place. This can be intensified by active feeding by the air feeding device 8.

Thus, the fuel cell exhaust gas is diluted with air, whereby a mixed exhaust gas is formed, the hydrogen concentration in the mixed exhaust gas being lowered and distribution of condensed-out water in the mixed exhaust gas also being promoted, so that formation of clouds of vapor from condensed-out water is prevented at cold times of the year. Permissible limit values for hydrogen exposure into the environment can be maintained more easily.

Integration of the heat exchanger outlet for carrying away the air passed through the heat exchanger into the exhaust system, into which the outlet of the fuel cell exhaust gas also leads, makes it possible to dispense with separate outlets for the respective exhaust gases. This simplifies the structural design of the exhaust system.

FIG. 2 shows an exhaust system 10 for a device having at least one fuel cell. Arranged one behind the other in the air flow path B are: an air inlet 6 for supplying air, that is to say fresh air from the vicinity of the exhaust system 10, a heat exchanger 7, which heats up the supplied air, and an air feeding device 8 for feeding in the supplied air. The supplied air is admitted through the specified components to a mixing region 9.

Also leading into the mixing region 9 is an outlet 13 of the exhaust duct 11, which in this exemplary embodiment serves for transporting fuel cell exhaust gas comprising anode purging gas, anode-side and cathode-side exhaust gas of the fuel cell. The fuel cell exhaust gas is thereby supplied to the exhaust duct 11 by way of an inlet 12.

Intermixing of fuel cell exhaust gas transported by way of the exhaust duct 11 with the air fed in by the air feeding device 8 and forming of a mixed exhaust gas then takes place in the mixing region 9. The mixed exhaust gas comprising the thus-diluted fuel cell exhaust gas, that is to say substantially air-diluted hydrogen, argon, oxygen and condensed-out water, is carried away from the exhaust system 10 by way of a mixed exhaust gas outlet 14 and is distributed in the vicinity of the exhaust system 10. Limit values for hydrogen exposure can thereby be maintained very easily.

The individual components, that is to say in particular the exhaust duct 11, the outlet 13 of the exhaust duct 11, the structure and arrangement of the heat exchanger 7 and the air feeding device 8, and also the configuration of the mixing region 9 are structured and arranged with a view to an optimum suction effect and intermixing of the exhaust gas stream to be carried, so that the mixed exhaust gas is homogeneously intermixed and efficiently and widely distributed into the environment of the exhaust system 10. Additional modifications or surface structures, in particular in the mixing region 9, can additionally minimize formation of clouds of vapor from condensed water.

Further mixing devices, in particular in the mixing region 9, and/or sound-damping elements, may preferably be provided.

The foregoing description of the present invention serves only for illustrative purposes and not for the purpose of restricting the invention. Various changes and modifications are possible within the context of the invention without departing from the scope of the invention and the equivalents thereof.

LIST OF DESIGNATIONS 1 fuel cell
2 anode-side exhaust gas
2a anode exhaust gas line
2b anode purging gas valve
2c anode exhaust-gas outlet valve
3 cathode-side exhaust gas
4 mixing device
5 hydrogen sensor
6 air inlet
7 heat exchanger
8 air feeding device
9 mixing region
10 exhaust system
11 exhaust ducting
12 inlet of the exhaust ducting
13 outlet of the exhaust ducting
14 mixed exhaust gas outlet
15 water tank
16 water line
17 water outlet line
18 water feeding device
A fuel cell exhaust-gas flow path
B air flow path The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust system for a device having at least one PEM fuel cell, the exhaust system, comprising:
   at least one exhaust duct that transports exhaust gas of the PEM fuel cell;
   at least one air inlet that supplies fresh air;
   at least one fan that feeds in the supplied fresh air;
   at least one heat exchanger;
   a mixing region that mixes the exhaust gas of the PEM fuel cell transported by way of the exhaust duct with the supplied air and forms a mixed exhaust gas; and
   a mixed exhaust gas outlet that carries the mixed exhaust gas away from the exhaust system, wherein
      the supplied fresh air is introduced into the heat exchanger and is fed through the heat exchanger, and whereby a heating up of the fresh air increases a water absorption ability of the fresh air, in order to substantially prevent formation of visible clouds of vapor from condensed-out water in winter time.

2. The exhaust system according to claim 1, wherein, in a direction of flow, the fan is arranged upstream of, downstream of, or in the heat exchanger.

3. The exhaust system according to claim 2, wherein:
   an outlet of the exhaust duct is arranged upstream of or within the air feeding device, and/or
   an anode-side exhaust gas of the PEM fuel cell is supplied upstream of and/or into an inlet of the exhaust duct and/or is supplied in the mixing region.

4. The exhaust system according to claim 1, wherein the mixed exhaust gas outlet has a spiral structure, a fan shaped structure, or a structure with at least two regions having different cross-sections.

5. The exhaust system according to claim 1, further comprising:
   at least one static mixer that intermixes the exhaust gas of the PEM fuel cell with the supplied air.

6. The exhaust system according to claim 1, wherein the mixing region is designed to be conducive to evaporation of water contained in cathode-side exhaust gas of the PEM fuel cell.

7. The exhaust system according to claim 1, wherein a pressure level in the exhaust duct is greater than a pressure level in the heat exchanger and/or in the air feeding device.

8. The exhaust system according to claim 1, further comprising at least one sound-damping element.

9. The exhaust system according to claim 1, wherein the heat exchanger is a partially passively operated heat exchanger.

10. The exhaust system according to claim 1, wherein a distance between the heat exchanger and the exhaust duct is selected to achieve a defined suction effect and intermixing of the exhaust gas of the PEM fuel cell with the supplied air.

11. The exhaust system according to claim 1, further comprising:
a mixer that mixes anode-side exhaust gas of the PEM fuel cell and cathode-side exhaust gas of the PEM fuel cell upstream of or at an inlet of the exhaust duct.

12. The exhaust system according to claim 11, further comprising at least one hydrogen sensor arranged in the exhaust duct.

13. The exhaust system according to claim 1, further comprising at least one hydrogen sensor arranged in the exhaust duct.

14. The exhaust system according to claim 1, further comprising:
a water tank;
a water feeder configured to supply water from the water tank into the PEM fuel cell via a water line;
a water outlet line arranged to carry water away from the water tank, wherein
the water outlet line leads into at least one of:
a cathode-side exhaust gas of the PEM fuel cell,
a mixer that mixes anode-side exhaust gas of the PEM fuel cell and the cathode-side exhaust gas,
the at least one air inlet,
the heat exchanger,
the mixing region, and
the at least one exhaust duct.

15. The exhaust system according to claim 1, further comprising:
an anode exhaust gas line that transports anode-side exhaust gas of the PEM fuel cell; and
an anode purging gas valve and an anode exhaust-gas outlet valve arranged in the anode exhaust gas line, the anode purging gas valve and the anode exhaust-gas outlet valve being provided between the exhaust duct and the PEM fuel cell.

16. A motor vehicle, comprising:
at least one PEM fuel cell;
an exhaust system, the exhaust system comprising:
at least one exhaust duct that transports exhaust gas of the PEM fuel cell;
at least one air inlet that supplies fresh air;
at least one fan that feeds in the supplied fresh air;
at least one heat exchanger;
a mixing region that mixes the exhaust gas of the PEM fuel cell transported by way of the exhaust duct with the supplied fresh air and forms a mixed exhaust gas; and
a mixed exhaust gas outlet that carries the mixed exhaust gas away from the exhaust system, wherein
the supplied air is introduced into the heat exchanger and is fed through the heat exchanger, and whereby a heating up of the fresh air increases a water absorption ability of the fresh air, in order to substantially prevent formation of visible clouds of vapor from condensed-out water in winter time.

17. The motor vehicle according to claim 16, wherein:
the heat exchanger is arranged in a rear and/or a lateral part of the motor vehicle, and/or
the mixed exhaust gas outlet is arranged in the rear and/or the lateral part of the motor vehicle.

18. The exhaust system according to claim 1, wherein the fresh air flows through the heat exchanger in a same direction as the mixed exhaust gas that flows laterally adjacent to the heat exchanger in the exhaust duct.

19. The motor vehicle according to claim 16, wherein the fresh air flows through the heat exchanger in a same direction as the mixed exhaust gas that flows laterally adjacent to the heat exchanger in the exhaust duct.

* * * * *